(12) United States Patent
Connell

(10) Patent No.: US 11,518,218 B2
(45) Date of Patent: Dec. 6, 2022

(54) ACTIVE CONTROL OVER VEHICLE ACCESS BY AN OZONE-BASED VEHICLE DEODORIZATION SYSTEM

(71) Applicant: Toyota Motor Engineering & Manufacturing North America, Inc., Erlanger, KY (US)

(72) Inventor: Eric J Connell, Dexter, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 683 days.

(21) Appl. No.: 16/513,321

(22) Filed: Jul. 16, 2019

(65) Prior Publication Data

US 2021/0016639 A1 Jan. 21, 2021

(51) Int. Cl.
*B60H 3/00* (2006.01)
*B60R 25/24* (2013.01)
*E05F 15/70* (2015.01)
*B60H 1/00* (2006.01)

(52) U.S. Cl.
CPC ....... *B60H 3/0085* (2013.01); *B60H 1/00778* (2013.01); *B60R 25/24* (2013.01); *E05F 15/70* (2015.01); *E05Y 2400/45* (2013.01); *E05Y 2900/55* (2013.01)

(58) Field of Classification Search
CPC ... B60H 3/0085; B60H 1/00778; E05F 15/70; B60R 25/24; E05Y 2400/45; E05Y 2900/55
USPC .......................................................... 701/49
See application file for complete search history.

(56) References Cited

U.S. PATENT DOCUMENTS

| | | | |
|---|---|---|---|
| 7,406,832 B2 | 8/2008 | Wiedemann et al. | |
| 8,145,383 B2* | 3/2012 | Prokhorov | B60H 1/008 454/75 |
| 10,596,876 B2* | 3/2020 | Dhake | B60H 1/0073 |
| 2006/0079168 A1 | 4/2006 | Goldsmith | |

(Continued)

FOREIGN PATENT DOCUMENTS

| | | | | |
|---|---|---|---|---|
| CA | 2839342 A1 * | 7/2014 | .......... | F24F 11/0001 |
| CA | 2839568 A1 * | 7/2014 | .............. | F24F 11/30 |

(Continued)

OTHER PUBLICATIONS

Z.M. Durovic et al., "Control of Heating, Ventilation and Air Conditioning System Based on Neural Network," 2004, Publisher: IEEE.*

(Continued)

*Primary Examiner* — Tuan C To
(74) *Attorney, Agent, or Firm* — Jordan IP Law, LLC

(57) ABSTRACT

Methods and systems may provide for technology to initiate an injection of ozone for a predetermined cycle time into a cabin of a vehicle via a heating ventilation and air conditioning (HVAC) subsystem of the vehicle only when the vehicle is in a locked state and a window-closed state, the vehicle cabin is vacant, and the vehicle is in park. The technology may also cease the injection of the ozone into the cabin in response to an override request detected before expiration of the predetermined cycle time and maintains the vehicle in the locked state for a predetermined wait time after the injection of the ozone into the cabin is ceased.

20 Claims, 4 Drawing Sheets

(56) References Cited

U.S. PATENT DOCUMENTS

| | | | | |
|---|---|---|---|---|
| 2007/0158058 | A1* | 7/2007 | Arshad | B60H 1/00735 62/239 |
| 2011/0246022 | A1* | 10/2011 | Bai | B60H 1/008 702/22 |
| 2012/0204715 | A1* | 8/2012 | Hagan | B01D 46/46 96/25 |
| 2012/0264361 | A1 | 10/2012 | Scheer et al. | |
| 2016/0116181 | A1* | 4/2016 | Aultman | F24F 11/70 700/276 |
| 2016/0176261 | A1* | 6/2016 | Khorana | B60H 1/00821 62/126 |
| 2016/0288043 | A1* | 10/2016 | Meirav | B01D 53/50 |
| 2018/0057012 | A1* | 3/2018 | Delgado | E05F 15/695 |
| 2018/0106492 | A1* | 4/2018 | Papas | F24F 11/72 |
| 2018/0148180 | A1* | 5/2018 | Fagundes | B64D 13/00 |
| 2019/0084369 | A1* | 3/2019 | Duan | B60H 1/008 |
| 2019/0091738 | A1* | 3/2019 | Chen | B60H 1/00742 |
| 2019/0193528 | A1* | 6/2019 | Hattori | B60H 3/06 |
| 2019/0283525 | A1* | 9/2019 | Dhake | G06V 20/59 |
| 2019/0308487 | A1* | 10/2019 | Badger, II | B60H 1/00821 |
| 2019/0386887 | A1* | 12/2019 | Ricci | H04L 67/12 |
| 2020/0247219 | A1* | 8/2020 | Kleinow | B60H 3/0085 |

FOREIGN PATENT DOCUMENTS

| | | | | |
|---|---|---|---|---|
| CA | 2918085 A1 | * | 7/2016 | ......... F24F 11/0001 |
| CN | 106394183 A | * | 2/2017 | |
| CN | 206171116 U | * | 5/2017 | |
| CN | 104691281 B | * | 7/2018 | ............... B60H 3/06 |
| EP | 2757433 A2 | * | 7/2014 | ............... F24F 11/30 |

OTHER PUBLICATIONS

Peng et al., "Fuzzy-Control Design and Realization of Fresh Air Conditioning System," 2010, vol. 4, Publisher: IEEE.*
airpurifiers.com, Pros & Cons of Ozone-Generating Air Purifiers, retrieved from <airpurifiers.com/pages/ozone>, Jun. 5, 2019, 6 pages, Austin, TX, USA.

* cited by examiner

ACTIVE CONTROL OVER VEHICLE ACCESS BY AN OZONE-BASED VEHICLE DEODORIZATION SYSTEM

TECHNICAL FIELD

Embodiments generally relate to vehicle controls. More particularly, embodiments relate to the active control over vehicle access by an ozone-based vehicle deodorization system.

BACKGROUND

A recent increase in the prevalence of ridesharing services (e.g., UBER, LYFT, TURO) has led to private vehicles being exposed to substantially more occupants/passengers. Due to the relatively heavy passenger throughput, maintaining the cabins of such vehicles free of unpleasant smells may be challenging to the owners and/or operators of the vehicles.

BRIEF SUMMARY

In one embodiment, a vehicle deodorization system comprises a heating ventilation and air conditioning (HVAC) subsystem, an access controller interface to selectively control whether a vehicle is in a locked state and a window-closed state, a cabin monitor interface to determine whether a cabin of the vehicle is vacant, a drive interface to determine whether the vehicle is in park, and an ozone generator coupled to the HVAC subsystem, the access controller interface, the cabin monitor interface, and the drive state interface, wherein the ozone generator includes a processor and memory having a set of instructions, which when executed by the processor, cause the ozone generator to initiate an injection of ozone for a predetermined cycle time into the cabin via the HVAC subsystem only when the vehicle is in the locked state and the window-closed state, the cabin is vacant, and the vehicle is in park, cease the injection of the ozone into the cabin in response to an override request detected before expiration of the predetermined cycle time, and maintain, via the access controller interface, the vehicle in the locked state for a predetermined wait time after the injection of the ozone into the cabin is ceased.

In another embodiment, at least one computer readable storage medium comprises a set of instructions, which when executed by an ozone generator, cause the ozone generator to initiate an injection of ozone for a predetermined cycle time into a cabin of a vehicle via a heating ventilation and air conditioning (HVAC) subsystem of the vehicle only when the vehicle is in a locked state and a window-closed state, the vehicle cabin is vacant, and the vehicle is in park, cease the injection of the ozone into the cabin in response to an override request detected before expiration of the predetermined cycle time, and maintain the vehicle in the locked state for a predetermined wait time after the injection of the ozone into the cabin is ceased.

In yet another embodiment, a method of operating a vehicle deodorization system comprises initiating an injection of ozone for a predetermined cycle time into a cabin of a vehicle via a heating ventilation and air conditioning (HVAC) subsystem of the vehicle only when the vehicle is in a locked state and a window-closed state, the vehicle cabin is vacant, and the vehicle is in park, ceasing the injection of the ozone into the cabin in response to an override request detected before expiration of the predetermined cycle time, and maintaining the vehicle in the locked state for a predetermined wait time after the injection of the ozone into the cabin is ceased.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
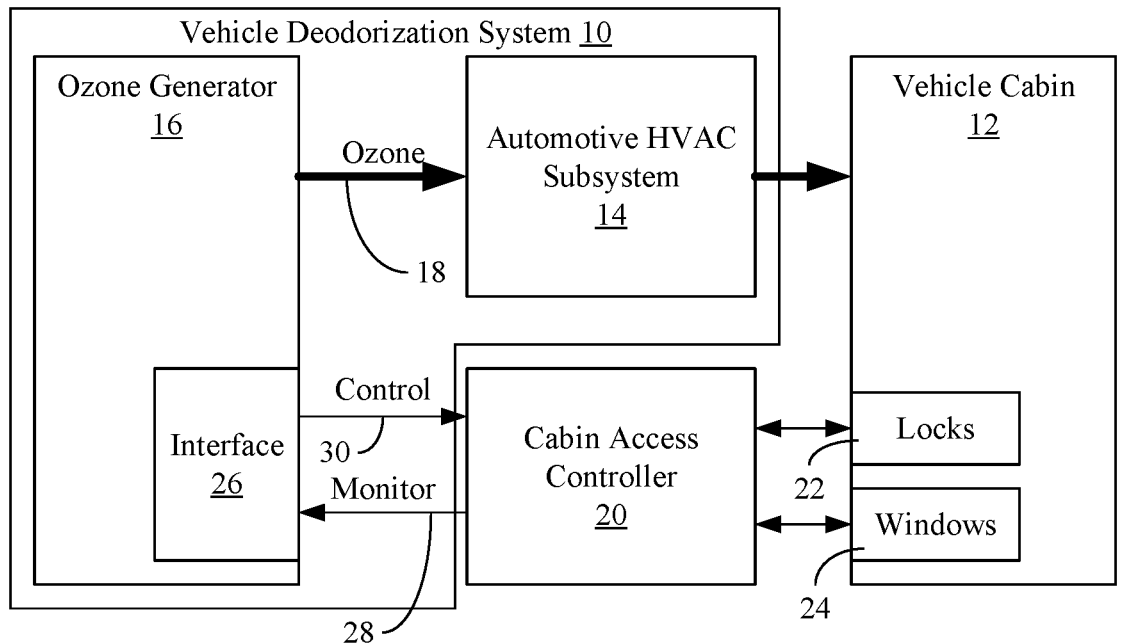
FIG. 1 is a block diagram of an example of a portion of a vehicle according to an embodiment.

Turning now to FIG. 1, a portion of a vehicle (e.g., car, taxi, shuttle, truck, van, sport utility vehicle/SUV, aircraft, etc.) is shown in which a vehicle deodorization system 10 is coupled to a vehicle cabin 12. In an embodiment, the vehicle provides ridesharing services and is therefore exposed to a relatively high volume/throughput of occupants and/or passengers. Accordingly, there may be concerns over the presence of unpleasant smells within the cabin 12 during ridesharing trips (e.g., odors left behind by previous passengers). In the illustrated example, the deodorization system 10 includes an ozone generator 16 that injects ozone 18 into the vehicle cabin 12 via a heating ventilation and air conditioning (HVAC) subsystem 14 (e.g., including various fans, conduits, thermostats, etc.). The ozone 18 may generally be effective at reacting with and eliminating strong odors and airborne chemicals. In an embodiment, the ozone 18 naturally has a fresh scent to it, similar to that of a "crisp" smelling air freshener. The combination of a fresh smell and the ability to remove unpleasant odors may make the ozone 18 appealing to vehicle owners as an air purifying chemical/device.

As will be discussed in greater detail, concerns over health (e.g., respiratory) hazards potentially presented by the ozone 18 may be obviated by enabling the ozone generator 16 to actively control access to the vehicle cabin 12 via a cabin access controller 20. For example, the ozone generator 16 may initiate an injection of the ozone 18 for a predetermined cycle time into the cabin 12 via the HVAC system 14 only when certain conditions exist such as, for example, locks 22 of the vehicle being activated (e.g., the vehicle is in a locked state), the windows 24 of the vehicle being up/closed (e.g., the vehicle is in a window-closed state), the cabin 12 being vacant (e.g., no human or animal occupants), the vehicle being in park, and so forth. Moreover, if someone attempts to enter the cabin 12 while unsafe levels of the ozone 18 are still present in the cabin 12 (e.g., before expiration of the predetermined cycle time), the illustrated ozone generator 16 actively maintains the vehicle in the locked state until the ozone 18 in the cabin 12 has reduced to a safe level.

For example, the illustrated ozone generator 16 includes an interface 26 that receives monitor information 28 that specifies the state of the locks 22 and windows 24. The ozone generator 16 may also issue one or more control signals 30 to the cabin access controller 20, wherein the control signal(s) 30 instruct the cabin access controller 20 to maintain the vehicle in the locked state. Once the ozone generator 16 has confirmed that the ozone 18 levels in the cabin 12 are safe, the ozone generator 16 may use the control signals 30 to unlock the vehicle cabin 12. The illustrated deodorization system 10 therefore exhibits enhanced performance in terms of more effective removal of odors while ensuring occupant safety.

Figure 2:
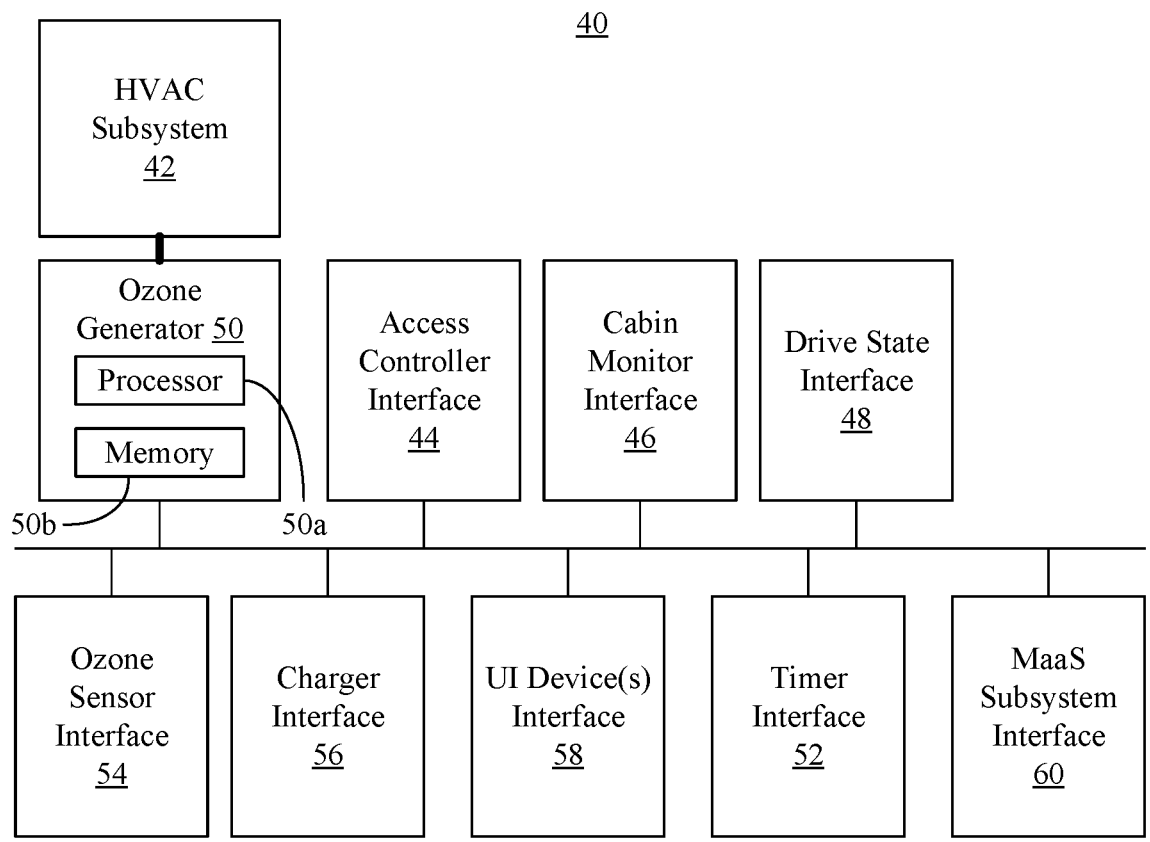
FIG. 2 is a block diagram of an example of a vehicle deodorization system according to an embodiment.

FIG. 2 shows a more detailed example of a vehicle deodorization system 40. The illustrated vehicle deodorization system 40 may be readily substituted for the vehicle deodorization system 10 (FIG. 1), already discussed. In the illustrated example, the system 40 includes an HVAC subsystem 42 and an access controller interface 44 to selectively control whether a vehicle is in a locked state and a window-closed state. The system 40 may also include a cabin monitor interface 46 to determine whether a cabin of the vehicle is vacant. In an embodiment, the cabin monitor interface 46 communicates with seat pressure sensors, motion sensors, cameras, microphones, etc. (not shown), to determine whether the cabin of the vehicle is vacant. The illustrated system 40 also includes a drive state interface 48 to determine whether the vehicle is in park. In an embodiment, the drive state interface 48 communicates with an electrical onboard system and/or a transmission controller to determine whether the vehicle is in park.

Additionally, the illustrated system 40 includes an ozone generator 50 (50a, 50b) having a processor 50a (e.g., embedded controller, central processing unit/CPU) and a memory 50b (e.g., non-volatile memory/NVM and/or volatile memory) containing a set of instructions, which when executed by the processor 50a, cause the ozone generator 50 to initiate an injection of ozone for a predetermined cycle time (e.g., amount of time to deliver a sufficient amount of ozone to deodorize the cabin and permit the ozone to dissipate and/or be removed) into the cabin via the HVAC subsystem 42 only when the vehicle is in the locked state and the window-closed state, the cabin is vacant, and the vehicle is in park. Although the ozone generator 50 is illustrated as being separate from (e.g., inline with) the HVAC subsystem 42, the ozone generator 50 may alternatively be integrated with the HVAC subsystem 42.

In an embodiment, execution of the instructions by the processor 50a also causes the ozone generator 50 to cease the injection of the ozone into the cabin in response to an override request detected before expiration of the predetermined cycle time. In general, the override request is associated with an attempt by someone to enter the vehicle cabin. Thus, the override request might originate from a proximity sensor detecting a nearby vehicle key fob, a wireless communication module detecting an unlock button press, and so forth. Accordingly, if the override request is detected before expiration of the predetermined cycle time, there may be an occupant safety concern.

To address this concern, the illustrated ozone generator 50 actively maintains, via the access controller interface 44, the vehicle in the locked state for a predetermined wait time after injection of the ozone into the cabin is ceased. In one example, the ozone generator 50 activates a timer via a timer interface 52 in response to the override request and issues an unlock signal via the access controller interface 44 upon expiration of the timer. Issuance of the unlock signal may additionally be conditioned on an ozone sensor interface 54 determining that the ozone level is below a threshold based on communications with one or more ozone sensors (not shown) located within the cabin. In an embodiment, execution of the instructions by the processor 50a also causes the ozone generator 50 to issue a window open signal via the access controller interface 44 in response to the override request. Such an approach may enable the ozone to be replaced with fresh air more rapidly.

The ozone injection sequence/procedure may be triggered by various different conditions. For example, the system 40 may include one or more user interface (UI) device interfaces 58 such as, for example, a key fob interface, touch screen, microphone, etc., wherein execution of the instructions by the processor 50a causes the ozone generator 50 to detect an activation request via the UI device interface(s) 58, wherein the injection of ozone is initiated in response to the activation request (e.g., subject to other conditions such as locked state, window-closed state, vacancy, park, etc., being present).

If the vehicle is an electric vehicle (EV), the system 40 might also include a charger interface 56, where the ozone generator 50 uses the charger interface 56 to determine whether the vehicle is in an EV charging state. In such a case, an opportunity the deodorize the vehicle may exist (e.g., between rides). Accordingly, execution of the instructions may cause the ozone generator 50 to initiate the injection of the ozone in response to the vehicle being in the EV charging state (e.g., subject to other conditions such as locked state, window-closed state, vacancy, park, etc., being present).

In another embodiment, the ozone generator 50 uses the charger interface 56 to determine the EV battery level (e.g., amount of charge). In such a case, execution of the instructions by the processor 50a may cause the ozone generator 50 to bypass the injection of the ozone into the cabin in response to the EV battery level being insufficient to complete the predetermined cycle time (e.g., even if other conditions such as locked state, window-closed state, vacancy, park, etc., are present). Such an approach may prevent the deodorization cycle from fully depleting the vehicle battery.

Moreover, in rideshare and/or Mobility-as-a-Service (Maas) settings, the system 40 may include a MaaS subsystem interface 60. In such a case, execution of the instructions by the processor 50a may cause the ozone generator 50 to detect that the vehicle is in a MaaS downtime state (e.g., rideshare application is closed and/or in a do not disturb state), wherein the injection of ozone is initiated in response to the vehicle being in the downtime state (e.g., subject to other conditions such as locked state, window-closed state, vacancy, park, etc., being present). In one example, the MaaS subsystem interface 60 communicates wirelessly (e.g., Bluetooth, Wi-Fi, short messaging service/SMS text) with a client device running the rideshare application to detect the downtime state. The illustrated deodorization system 40 therefore exhibits enhanced performance in terms of more effective removal of odors while ensuring occupant safety, automatically identifying deodorization opportunities in EV and/or MaaS settings, and so forth.

Figure 3:
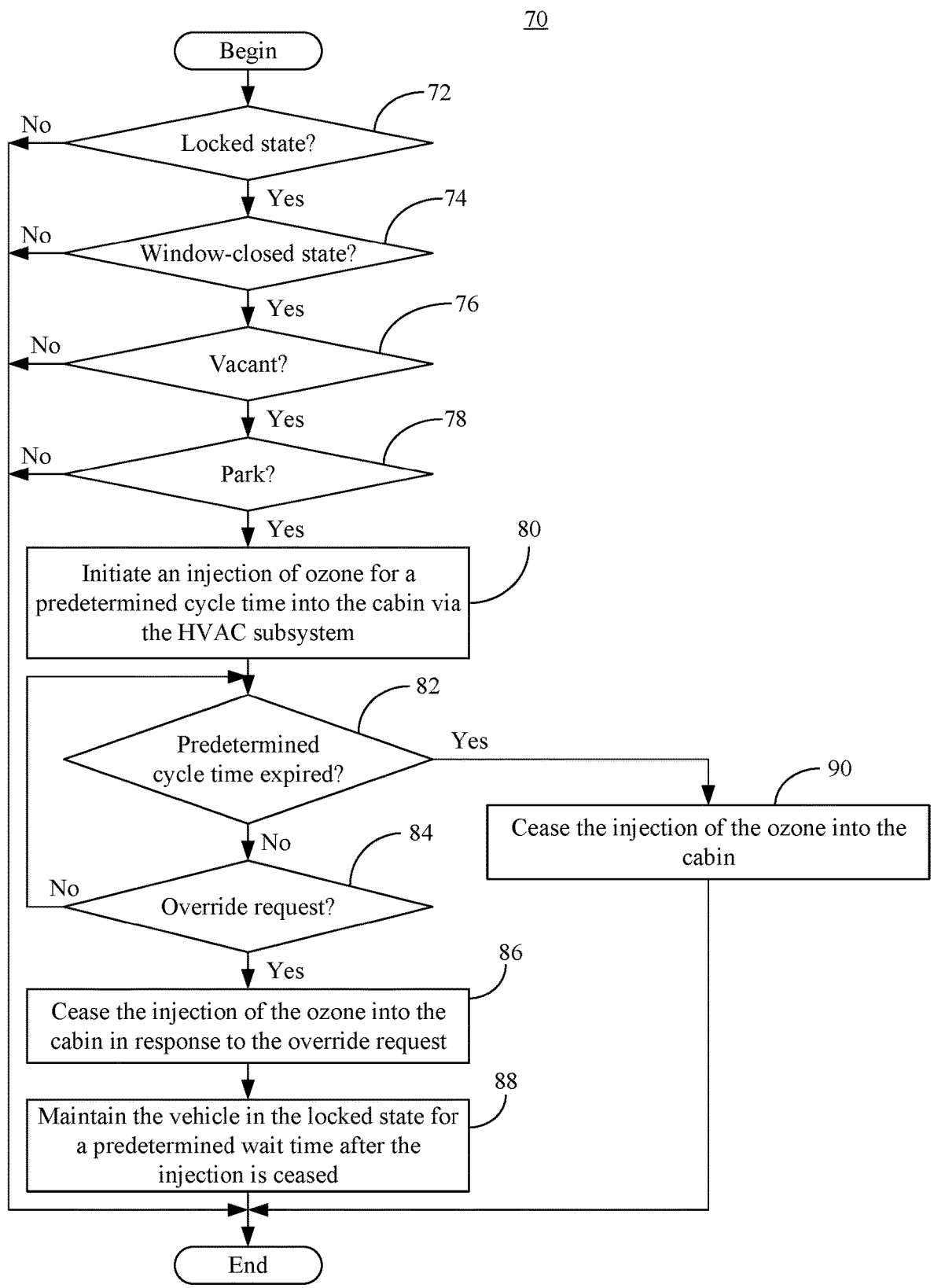
FIG. 3 is a flowchart of an example of a method of operating a vehicle deodorization system according to an embodiment.

FIG. 3 shows a method 70 of operating a vehicle deodorization system such as, for example, the system 10 (FIG. 1) and/or the system 40 (FIG. 2). The method 70 may be implemented in logic instructions (e.g., software), configurable logic, fixed-functionality hardware logic, etc., or any combination thereof. Illustrated processing block 72 determines whether a vehicle is in a locked state. If so, block 74 determines whether the vehicle is in a window-closed state. If the vehicle is in the window-closed state, a determination may be made at block 76 determines whether the vehicle is vacant. If so, illustrated block 78 determines whether the vehicle is in park. If the vehicle is in park, block 80 initiates an injection of ozone for a predetermined cycle time into the cabin via the HVAC subsystem. In one example, the predetermined cycle time is an estimated amount of time to deliver a sufficient amount of ozone to deodorize the cabin and permit the ozone to dissipate and/or be removed.

In an embodiment, a determination is made at block 82 as to whether the predetermined cycle time has expired. If not, illustrated block 84 determines whether an override request has been received/detected (e.g., an attempt is being made by someone to enter the vehicle cabin). If an override request has been received, block 86 may provide for ceasing the injection of the ozone into the cabin in response to the override request (e.g., which is detected before expiration of the predetermined cycle time). In one example, block 86 also provides for issuing a window open signal via an access controller in response to the override request. Additionally, the vehicle is maintained (e.g., via an access controller and/or access controller interface) in the locked state at block 88 for a predetermined wait time after the injection is ceased. The illustrated method 70 then terminates.

If it is determined at block 72 that the vehicle is not in the locked state, a safety concern may exist and the method 70 terminates. Additionally, if it is determined at block 74 that the vehicle is not in the window-closed state, the deodorization may not be effective and the method 70 terminates. Moreover, if it is determined at block 76 that the vehicle is not vacant, a safety concern may exist and the method 70 terminates. In addition, if it is determined at block 78 that the vehicle is not in park, a safety concern may exist and the method 70 terminates.

If it is determined at block 82 that the predetermined cycle time has expired, the deodorization cycle is complete and illustrated block 90 ceases the injection of the ozone into the cabin prior to terminating. If it is determined at block 84 that an override request has not been received while the predetermined cycle time is still active, the method 70 may return to block 82. The illustrated method 70 therefore achieves enhanced performance in terms of more effective removal of odors while ensuring occupant safety.

Figure 4:
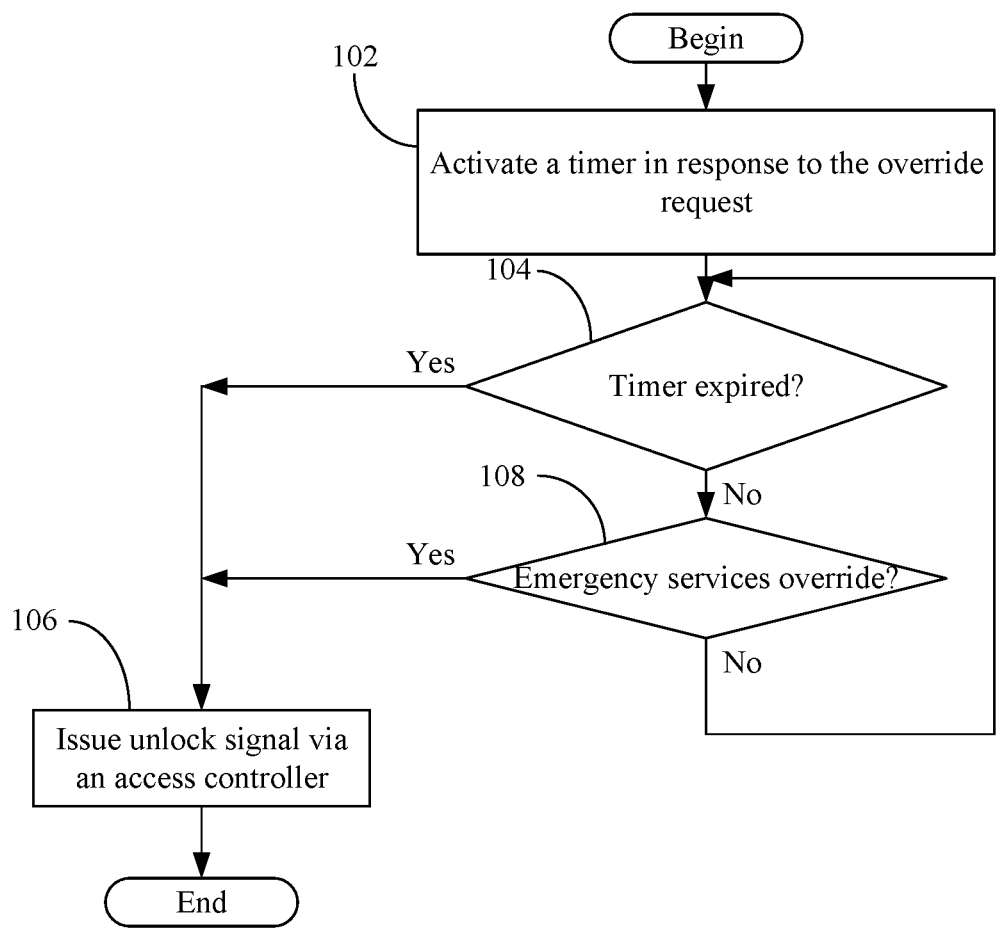
FIG. 4 is a flowchart of an example of a method of maintaining a vehicle in a locked state according to an embodiment.

FIG. 4 shows a method 100 of maintaining a vehicle in a locked state. The method 100 may generally be implemented in a vehicle deodorization system such as, for example, the system 10 (FIG. 1) and/or the system 40 (FIG. 2). Additionally, the method 100 may be readily substituted for block 88 (FIG. 3), already discussed. In an embodiment, the method 100 is implemented in logic instructions (e.g., software), configurable logic, fixed-functionality hardware logic, etc., or any combination thereof. Illustrated processing block 102 activates a timer in response to an override request that is received before expiration of a predetermined cycle time associated with the injection of ozone into a vehicle cabin. A determination may be made at block 104 as to whether the timer has expired. if so, the illustrated method 100 issues an unlock signal via an access controller at block 106 and the method 100 terminates. In one example, block 104 also checks the state of an ozone monitor within the cabin prior to proceeding to block 106 (e.g., as an extra level of safety protection).

If it is determined at block 104 that the timer has not expired, illustrated block 108 determines whether an emergency services override is present. In an embodiment, the emergency services override is associated with a need to enter the vehicle in situations that are potentially more harmful than exposure to relatively high levels of ozone (e.g., the vehicle is blocking a fire hydrant during a fire). If an emergency services override is detected, the illustrated method 100 proceeds to block 106. If no emergency service override is detected, the method 100 may return to block 104.

Figure 5:
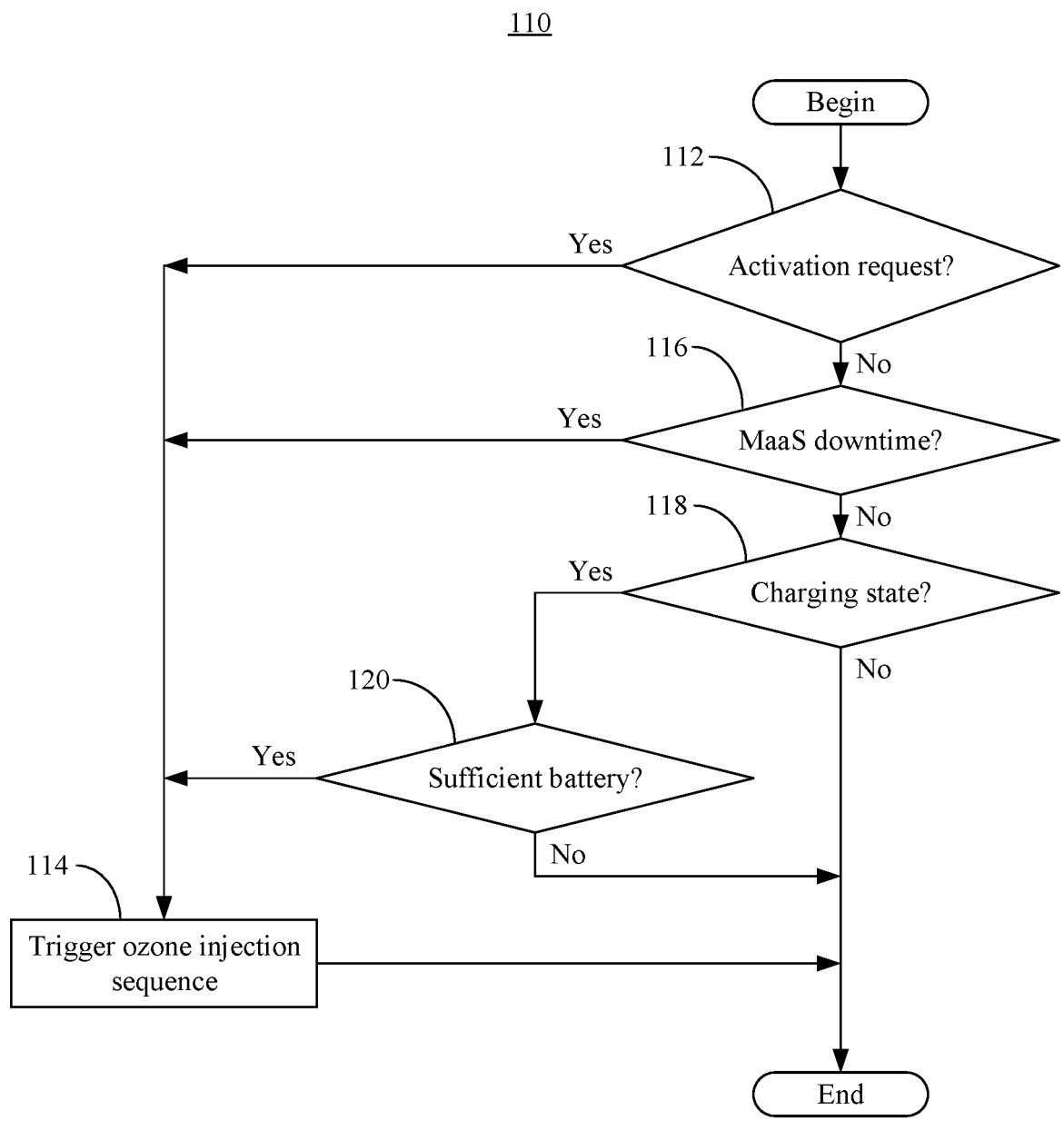
FIG. 5 is a flowchart of an example of a method of controlling the initiation of an ozone injection according to an embodiment.

FIG. 5 shows a method 110 of controlling the initiation of an ozone injection. The method 110 may generally be implemented in a vehicle deodorization system such as, for example, the system 10 (FIG. 1) and/or the system 40 (FIG. 2). In an embodiment, the method 110 is implemented in logic instructions (e.g., software), configurable logic, fixed-functionality hardware logic, etc., or any combination thereof. Illustrated processing block 112 determines whether an activation request has been detected. If so, block 114 triggers an ozone injection sequence such as, for example, the method 70 (FIG. 3), already discussed. If no activation request is detected, block 116 may determine whether the vehicle is in a MaaS downtime state (e.g., rideshare application is either closed or in a do not disturb state). If so, the method 110 proceeds to block 114 and triggers the ozone injection sequence. If the vehicle is not in the Maas downtime state, illustrated block 118 determines whether the vehicle is an EV currently in the charging state. If so, a determination is made at block 120 as to whether the EV battery level is sufficient to complete the predetermined cycle time. If not, the method 110 bypasses block 114 and terminates. Otherwise, the method 110 proceeds to block 114 and triggers the ozone injection sequence. The method 110 therefore achieves enhanced performance in terms of more effective removal of odors while ensuring occupant safety, automatically identifying deodorization opportunities in EV and/or MaaS settings, and so forth.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:
1. A vehicle deodorization system comprising:
   a heating ventilation and air conditioning (HVAC) subsystem;
   an access controller interface to selectively control whether a vehicle is in a locked state and a window-closed state;
   a cabin monitor interface to determine whether a cabin of the vehicle is vacant;
   a drive state interface to determine whether the vehicle is in park; and
   an ozone generator coupled to the HVAC subsystem, the access controller interface, the cabin monitor interface, and the drive state interface, wherein the ozone generator includes a processor and memory having a set of instructions, which when executed by the processor, cause the ozone generator to:
  initiate an injection of ozone for a predetermined cycle time into the cabin via the HVAC subsystem only when the vehicle is the locked state and the window-closed state, the cabin is vacant, and the vehicle is in park,
  cease the injection of the ozone into the cabin in response to an override request detected before expiration of the predetermined cycle time, and
  maintain, via the access controller interface, the vehicle in the locked state for a predetermined wait time after the injection of the ozone into the cabin is ceased.

2. The system of claim 1, further including a timer interface, wherein the instructions, when executed, cause the ozone generator to:
  activate a timer via the timer interface in response to the override request, and
  issue an unlock signal via the access controller interface upon expiration of the timer.

3. The system of claim 1, wherein the instructions, when executed, cause the ozone generator to issue a window open signal via the access controller interface in response to the override request.

4. The system of claim 1, further including a user interface device, wherein the instructions, when executed, cause the ozone generator to detect an activation request via the user interface device, and wherein the injection of ozone is initiated in response to the activation request.

5. The system of claim 1, wherein the instructions, when executed, cause the ozone generator to detect that the vehicle is in an electric vehicle charging state, and wherein the injection of ozone is initiated in response to the vehicle being in the electric vehicle charging state.

6. The system of claim 1, wherein the instructions, when executed, cause the ozone generator to:
  detect that an electric vehicle battery level associated with the vehicle is insufficient to complete the predetermined cycle time; and
  bypass the injection of the ozone into the cabin in response to the electric vehicle battery level being insufficient to complete the predetermined cycle time.

7. The system of claim 1, wherein the instructions, when executed, cause the ozone generator to detect that the vehicle is in a Mobility-as-a-Service (Maas) downtime state, wherein the injection of ozone is initiated in response to the vehicle being in the MaaS downtime state.

8. At least one computer readable storage medium comprising a set of instructions, which when executed by a computer, cause the computer to:
  initiate an injection of ozone for a predetermined cycle time into a cabin of a vehicle via a heating ventilation and air conditioning (HVAC) subsystem of the vehicle only when the vehicle is in a locked state and a window-closed state, the vehicle cabin is vacant, and the vehicle is in park;
  cease the injection of the ozone into the cabin in response to an override request detected before expiration of the predetermined cycle time; and
  maintain the vehicle in the locked state for a predetermined wait time after the injection of the ozone into the cabin is ceased.

9. The at least one computer readable storage medium of claim 8, wherein the instructions, when executed, cause the computer to:
  activate a timer in response to the override request; and
  issue an unlock signal via an access controller upon expiration of the timer.

10. The at least one computer readable storage medium of claim 8, wherein the instructions, when executed, cause the computer to issue a window open signal via an access controller in response to the override request.

11. The at least one computer readable storage medium of claim 8, wherein the instructions, when executed, cause the computer to detect an activation request via a user interface, and wherein the injection of ozone is initiated in response to the activation request.

12. The at least one computer readable storage medium of claim 8, wherein the instructions, when executed, cause the computer to detect that the vehicle is in an electric vehicle charging state, and wherein the injection of ozone is initiated in response to the vehicle being in the electric vehicle charging state.

13. The at least one computer readable storage medium of claim 8, wherein the instructions, when executed, cause the computer to:
  detect that an electric vehicle battery level associated with the vehicle is insufficient to complete the predetermined cycle time; and
  bypass the injection of the ozone into the cabin in response to the electric vehicle battery level being insufficient to complete the predetermined cycle time.

14. The at least one computer readable storage medium of claim 8, wherein the instructions, when executed, cause the computer to detect that the vehicle is in a Mobility-as-a-Service (Maas) downtime state, wherein the injection of ozone is initiated in response to the vehicle being in the MaaS downtime state.

15. A method of operating a vehicle deodorization system comprising:
  initiating an injection of ozone for a predetermined cycle time into a cabin of a vehicle via a heating ventilation and air conditioning (HVAC) subsystem of the vehicle only when the vehicle is in a locked state and a window-closed state, the vehicle cabin is vacant, and the vehicle is in park;
  ceasing the injection of the ozone into the cabin in response to an override request detected before expiration of the predetermined cycle time; and
  maintaining the vehicle in the locked state for a predetermined wait time after the injection of the ozone into the cabin is ceased.

16. The method of claim 15, further including:
  activating a timer in response to the override request; and
  issuing an unlock signal via an access controller upon expiration of the timer.

17. The method of claim 15, further including issuing a window open signal via an access controller in response to the override request.

18. The method of claim 15, further including detecting an activation request via a user interface, wherein the injection of ozone is initiated in response to the activation request.

19. The method of claim 15, further including detecting that the vehicle is in an electric vehicle charging state, wherein the injection of ozone is initiated in response to the vehicle being in the electric vehicle charging state.

20. The method of claim 15, further including:
  detecting that an electric vehicle battery level associated with the vehicle is insufficient to complete the predetermined cycle time; and bypassing the injection of the ozone into the cabin in response to the electric vehicle battery level being insufficient to complete the predetermined cycle time.

\* \* \* \* \*